United States Patent [19]

Kikuchi

[11] Patent Number: 4,484,802
[45] Date of Patent: Nov. 27, 1984

[54] OPTICAL READ-OUT LENS SYSTEM FOR OPTICALLY RECORDED DISKS

[75] Inventor: Juro Kikuchi, Hachiooji, Japan

[73] Assignee: Olympus Optical Co., Ltd., Tokyo, Japan

[21] Appl. No.: 410,998

[22] Filed: Aug. 24, 1982

[30] Foreign Application Priority Data

Sep. 7, 1981 [JP] Japan ................. 56-139829

[51] Int. Cl.³ .................................. G02B 9/34
[52] U.S. Cl. ...................... 350/469; 350/414
[58] Field of Search .................... 350/469, 414

[56] References Cited

U.S. PATENT DOCUMENTS 4,257,679  3/1981  Okawa ....................... 350/469
4,332,442  6/1982  Okawa ....................... 350/469

*Primary Examiner*—John K. Corbin
*Assistant Examiner*—Rebecca D. Gass
*Attorney, Agent, or Firm*—Cushman, Darby & Cushman

[57] ABSTRACT

An optical read-out lens system for optically recorded disks comprising a first, second, third and fourth lenses in which the first lens is a positive lens, the second lens is a negative lens, the third lens is a positive lens and the fourth lens is a positive meniscus lens, the optical read-out lens system comprising a small number of lenses, being light in weight and having large NA and long working distance.

7 Claims, 6 Drawing Figures

OPTICAL READ-OUT LENS SYSTEM FOR OPTICALLY RECORDED DISKS

BACKGROUND OF THE INVENTION (a) Field of the invention:

The present invention relates to an optical read-out lens system for optically recorded disks.

(b) Description of the prior art:

For an optical read-out lens system for optically recorded disks such as video disks, it is necessary to make the size of light spot on the disk 1μ or less because the lens system is used for reading out the very small signals recorded with high density on the disk. Besides, a reasonably large field angle is required in order to obtain a favourable light spot by continuously focusing the light onto the recorded portion on the optically recorded disk, which rotates at high speed, even when there is something imperfect in an automatic focusing mechanism or when there is inclination of a read-out lens caused due to tolerance in mounting accuracy of the read-out lens. Moreover, in some tracking methods, it is so arranged that the tracking signal is to be obtained through the lens system and, therefore, a reasonably large field angle is required in order to obtain the tracking signal. Furthermore, if the optically read-out lens for optically recorded disks comes into contact with the optically recorded disk, the optically recorded disk and read-out lens are broken. To prevent the above, the optical read-out lens system for optically recorded disks should have a long working distance. Besides, monochromatic light is generally used as the light to be supplied to the read-out lens system. Therefore, to increase the signal-to-noise ratio of playback signals amplified after being detected by a light detector, the optical read-out lens system for optically recorded disks should be made as transparent as possible for the light of the wavelength to be used. To increase the transparency of the lens system, the number of lenses constituting the optical read-out lens system for optically recorded disks should be limited to the minimum required number and lens surfaces thereof should be provided with antireflection coatings which ensure sufficient effect.

Recently, semiconductor lasers are being used as light sources for playback devices for optically recorded disks. To form a light spot of 1μ or less by the light of semiconductor laser with the wavelength about 800 nm, the read-out lens system should have large N.A. about 1.3 times compared with the case that He-Ne laser is used as the light source.

Besides, the playback devices employing semiconductor laser are now being put to practical use. Therefore, compared with the experimental stage up to the present, it is now required to provide an optical read-out lens system for optically recorded disks having still longer working distance.

SUMMARY OF THE INVENTION

It is, therefore, a primary object of the present invention to provide an optical read-out lens system for optically recorded disks such as video disks having large N.A. and long working distance and composed of a small number of lenses.

As shown in FIG. 1, the optical read-out lens system for optically recorded disks according to the present invention comprises a first, second, third and fourth lenses in the order from the light-source side wherein the first lens is a positive lens, the second lens is a negative lens, the third lens is a positive lens and the fourth lens is a positive meniscus lens arranged to be concave toward the disk side, the optical read-out lens system for optically recorded disks according to the present invention being arranged to fulfill the following conditions:

$$1.0 < |f_2|/f_1 < 1.4 \tag{1}$$

$$0.55 < f_4/f_3 < 0.8 \tag{2}$$

$$0.3 < d_4(n_2-1)/f < 0.55 \tag{3}$$

$$d_2 < 0.1f \tag{4}$$

wherein reference symbol f represents the focal strength of the lens system as a whole, reference symbols $f_1, f_2, f_3$ and $f_4$ respectively represent focal lengths of the first, second, third and fourth lenses, reference symbol $d_2$ represents the airspace between the first and second lenses, reference symbol $d_4$ represents the airspace between the second and third lenses, and reference symbol $n_2$ represents the refractive index of the second lens.

In the optical read-out lens system according to the present invention, the first and second lenses are arranged very close to each other as described later. Therefore, the focal lengths $f_1$ and $f_2$ of the first and second lenses and total focal length $f_{12}$ of the first and second lenses approximately have the relation expressed by the following formula.

$$1/f_{12} = 1/f_1 + 1/f_2$$

In case of a lens system having lens configuration like the lens system according to the present invention, the working distance becomes longer in the paraxial theory when $f_{12}$ is longer. Therefore, when the fact that $f_1 < 0$ and $f_2 < 0$ is taken into consideration, the working distance of the lens system becomes long when $|f_2|/f_1 \to 1$. If, however, $f_{12}$ is made too large, all of spherical aberration, coma and astigmatism will be overcorrected and it will become impossible to correct them by the other lens elements though a large $f_{12}$ is advantageous for making the working distance long. Therefore, it is necessary to arrange as $|f_2|/f_1 > 1$ as shown by the condition (1). If the condition (1) is not fulfilled and it becomes $|f_2|/f_1 < 1$, it becomes impossible to correct the above-mentioned aberrations.

If, on the contrary, $f_{12}$ is made small, i.e., if $|f_2|/f_1$ becomes large and it becomes $|f_2|/f_1 > 1.4$, the working distance cannot be made long and it becomes impossible to attain the object of the present invention. Besides, spherical aberration will be considerably undercorrected.

The condition (2) is established in order to prevent the working distance from becoming too short even when N.A. is made large. Besides, this condition is established also for correction of spherical aberration.

To put the total back focal point of the third and fourth lenses to a position of as far as possible large distance from the lens system, it is necessary to arrange as follows where reference symbol $D_6$ represents the distance between the rear principal point of the third lens and front principal point of the fourth lens. That is, it is necessary to arrange so that $f_4/f_3$ becomes large when $D_6$ is a negative value and becomes small when $D_6$ is a positive value.

In the lens system according to the present invention, the fourth lens is arranged as a meniscus lens and the radius of curvature $r_7$ of its surface on the object side (light-source side) is a small value. Therefore, to facilitate the manufacture of this lens, it is preferable to make the thickness $d_7$ of this lens large. When the value of $d_7$ is made large as described in the above, $D_6$ becomes a positive value and, therefore, it is preferable to make $f_4/f_3$ a small value. Due to the above-mentioned reason, the value of $f_4/f_3$ is defined as shown in the condition (2). If $f_4/f_3$ becomes larger than the upper limit of the condition (2), it becomes impossible to make the working distance long when N.A. is made large.

On the other hand, when $f_4/f_3$ is made small, spherical aberration occurs at the fourth lens. In the lens system according to the present invention, spherical aberration is overcorrected at the first and second lenses. Therefore, the above-mentioned overcorrected spherical aberration can be offset by spherical aberration caused by the fourth lens and this is desirable. If, however, $f_4/f_3$ becomes too small and becomes smaller than the lower limit of the condition (2), spherical aberration caused by the fourth lens becomes too large and spherical aberration of the lens system as a whole will be undercorrected.

The condition (3) is established in order to correct coma and astigmatism. When it is arranged to fulfill the condition (1), coma is overcorrected. This overcorrected coma is corrected by arranging that the value of $d_4(n_2-1)/f$ becomes smaller than the upper limit of the condition (3). Therefore, if said value becomes larger than the upper limit of the condition (3), it becomes impossible to correct coma. When $d_4$ is made small in order to make the value of $d_4(n_2-1)/f$ small, it is advantageous for making the lens system small. If, however, $d_4(n_2-1)/f$ becomes too small and becomes smaller than 0.3, i.e., the lower limit of the condition (3), it becomes impossible to correct astigmatism favourably.

In the lens system according to the present invention, the airspace $d_2$ between the first and second lenses is made small so that the surface on the image side (disk side) of the first lens and surface on the object side (light-source side) of the second lens contact each other at their circumferential portions. The condition (4) is established in order to arrange as described in the above. When the condition (4) is fulfilled, it is possible to arrange so that said surfaces of the first and second lenses contact each other at their circumferential portions. As a result, it is possible to assemble the lens system without inserting a spacer ring between the first and second lenses and, therefore, it is possible to assemble the lens system accurately and easily according to the design values. Besides, centering adjustment of lenses can be made quite easily. That is, when the condition (4) is fulfilled, it is possible to reduce the number of component parts and number of processes, simplify the manufacturing work and facilitate the manufacture in conformity with the design and, consequently, it is possible to reduce the price of the lens system. If the condition (4) is not fulfilled, said surfaces of the first and second lenses cannot be put into contact at their circumferential portions and, therefore, it is impossible to attain the abovementioned advantages.

To simplify the manufacture and to reduce the price as described in the above, it is more effective when radii of curvature $r_2$ and $r_4$ of the first and second lenses are respectively made as $r_2 = \infty$, $r_4 = \infty$, i.e., these surfaces are arranged as planar surfaces, as illustrated by respective embodiments shown later. By arranging so that the lens system fulfills the conditions (1) through (4), it is possible to obtain a lens system for which N.A. is large, working distance is long and aberrations are corrected favourably, as it will be understood from respective embodiments, even when the surfaces $r_2$ and $r_4$ of the first and second lenses are arranged as planar surfaces.

DETAILED DESCRIPTION OF THE PREFERRED EMBODIMENTS

Figure 1:
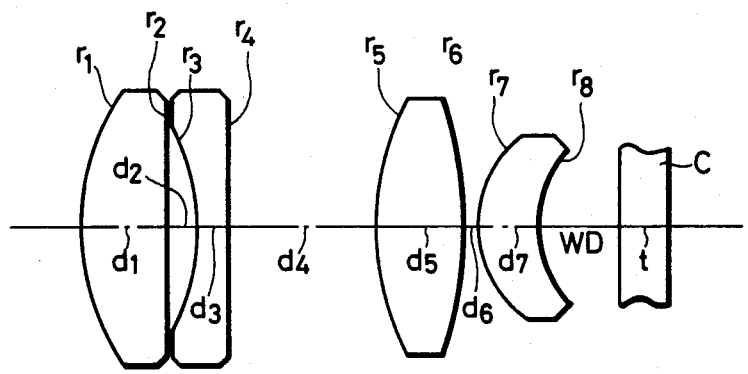
FIG. 1 shows a sectional view of the optical read-out lens system for optically recorded disks according to the present invention.

Now, preferred embodiments of the optical read-out lens system for optically recorded disks according to the present invention are shown below.

Embodiment 1
$r_1 = 2.2897$
$d_1 = 0.3060$   $n_1 = 1.76587$   $\nu_1 = 25.68$
$r_2 = \infty$
$d_2 = 0.0847$
$r_3 = -1.7698$
$d_3 = 0.1883$   $n_2 = 1.52449$   $\nu_2 = 48.9$
$r_4 = \infty$
$d_4 = 0.8378$
$r_5 = 2.3890$
$d_5 = 0.2589$   $n_3 = 1.76587$   $\nu_3 = 25.68$
$r_6 = -4.4886$
$d_6 = 0.0235$
$r_7 = 0.7656$
$d_7 = 0.2824$   $n_4 = 1.76587$   $\nu_4 = 25.68$
$r_8 = 1.6950$
$f = 1$   $\Sigma d = 1.9816$   $WD = 0.4000$
$NA = 0.53$   $t = 0.2842$   $n_t = 1.4886$
$|f_2|/f_1 = 1.1284$   $f_4/f_3 = 0.7783$
$d_4(n_2 - 1)/f = 0.4394$   object point $= \infty$ Embodiment 2
$r_1 = 1.6266$
$d_1 = 0.3552$   $n_1 = 1.76307$   $\nu_1 = 25.71$
$r_2 = \infty$
$d_2 = 0.0888$
$r_3 = -2.0974$
$d_3 = 0.1776$   $n_2 = 1.76307$   $\nu_2 = 25.71$
$r_4 = \infty$
$d_4 = 0.4883$
$r_5 = 2.9034$
$d_5 = 0.2886$   $n_3 = 1.76307$   $\nu_3 = 25.71$
$r_6 = -4.9245$
$d_6 = 0.0222$
$r_7 = 0.7913$
$d_7 = 0.2886$   $n_4 = 1.76307$   $\nu_4 = 25.71$
$r_8 = 2.6786$
$f = 1$   $\Sigma d = 1.7092$   $WD = 0.2949$
$NA = 0.6$   $t = 0.333$   $n_t = 1.50974$
$|f_2|/f_1 = 1.2894$   $f_4/f_3 = 0.5678$
$d_4(n_2 - 1)/f = 0.3726$   object point $= \infty$ Embodiment 3
$r_1 = 2.2184$
$d_1 = 0.2339$   $n_1 = 1.77861$   $\nu_1 = 25.71$
$r_2 = \infty$
$d_2 = 0.0809$
$r_3 = -1.8347$
$d_3 = 0.1475$   $n_2 = 1.51462$   $\nu_2 = 64.15$
$r_4 = \infty$
$d_4 = 0.8689$
$r_5 = 2.3558$
$d_5 = 0.2267$   $n_3 = 1.77861$   $\nu_3 = 25.71$
$r_6 = -7.4285$
$d_6 = 0.0180$
$r_7 = 0.7726$
$d_7 = 0.2482$   $n_4 = 1.77861$   $\nu_4 = 25.71$ -continued

```
r_8 = 1.9842
f = 1          Σd = 1.8241      WD = 0.4533
NA = 0.48      t = 0.2339       n_t = 1.50217
  |f_2|/f_1 = 1.2513            f_4/f_3 = 0.6424
    d_4(n_2 − 1)/f = 0.4472     object point = ∞
```

Embodiment 4

```
r_1 = 1.5905
d_1 = 0.3765   n_1 = 1.74404    ν_1 = 26.52
r_2 = ∞
d_2 = 0.0941
r_3 = −2.0805
d_3 = 0.1882   n_2 = 1.74404    ν_2 = 26.52
r_4 = ∞
d_4 = 0.5176
r_5 = 2.4326
d_5 = 0.3059   n_3 = 1.74404    ν_3 = 26.52
r_6 = −5.5123
d_6 = 0.0235
r_7 = 0.7523
d_7 = 0.3059   n_4 = 1.74404    ν_4 = 26.52
r_8 = 2.3248
f = 1          Σd = 1.8117      WD = 0.3038
NA = 0.53      t = 0.2842       n_t = 1.51072
  |f_2|/f_1 = 1.3078            f_4/f_3 = 0.5984
    d_4(n_2 − 1)/f = 0.3851     object point = ∞
```

Embodiment 5

```
r_1 = 1.6568
d_1 = 0.2778   n_1 = 1.74132    ν_1 = 26.52
r_2 = ∞
d_2 = 0.0611
r_3 = −2.1467
d_3 = 0.1852   n_2 = 1.74132    ν_2 = 26.52
r_4 = ∞
d_4 = 0.6483
r_5 = 2.4256
d_5 = 0.2408   n_3 = 1.74132    ν_3 = 26.52
r_6 = −5.1354
d_6 = 0.0185
r_7 = 0.7616
d_7 = 0.2408   n_4 = 1.74132    ν_4 = 26.52
r_8 = 2.0593
f = 1          Σd = 1.6726      WD = 0.3861
NA = 0.5       t = 0.2778       n_t = 1.50494
  |f_2|/f_1 = 1.2957            f_4/f_3 = 0.6707
    d_4(n_2 − 1)/f = 0.4806     object point = ∞
```

In embodiments shown in the above, reference symbols $r_1$ through $r_8$ respectively represent radii of curvature of respective lens surfaces, reference symbols $d_1$ through $d_7$ respectively represent thicknesses of respective lenses and airspaces between respective lenses, reference symbols $n_1$, $n_2$, $n_3$ and $n_4$ respectively represent refractive indices of respective lenses for the light with the wavelength to be used (800 nm), reference symbols $\nu_1, \nu_2, \nu_3$ and $\nu_4$ respectively represent Abbe's numbers of respective lenses at d-line, reference symbol WD represents the working distance, reference symbol t represents the thickness of the cover glass C, and reference symbol $n_t$ represents the refractive index of the cover glass C for the light with the wavelength to be used.

Figure 2:
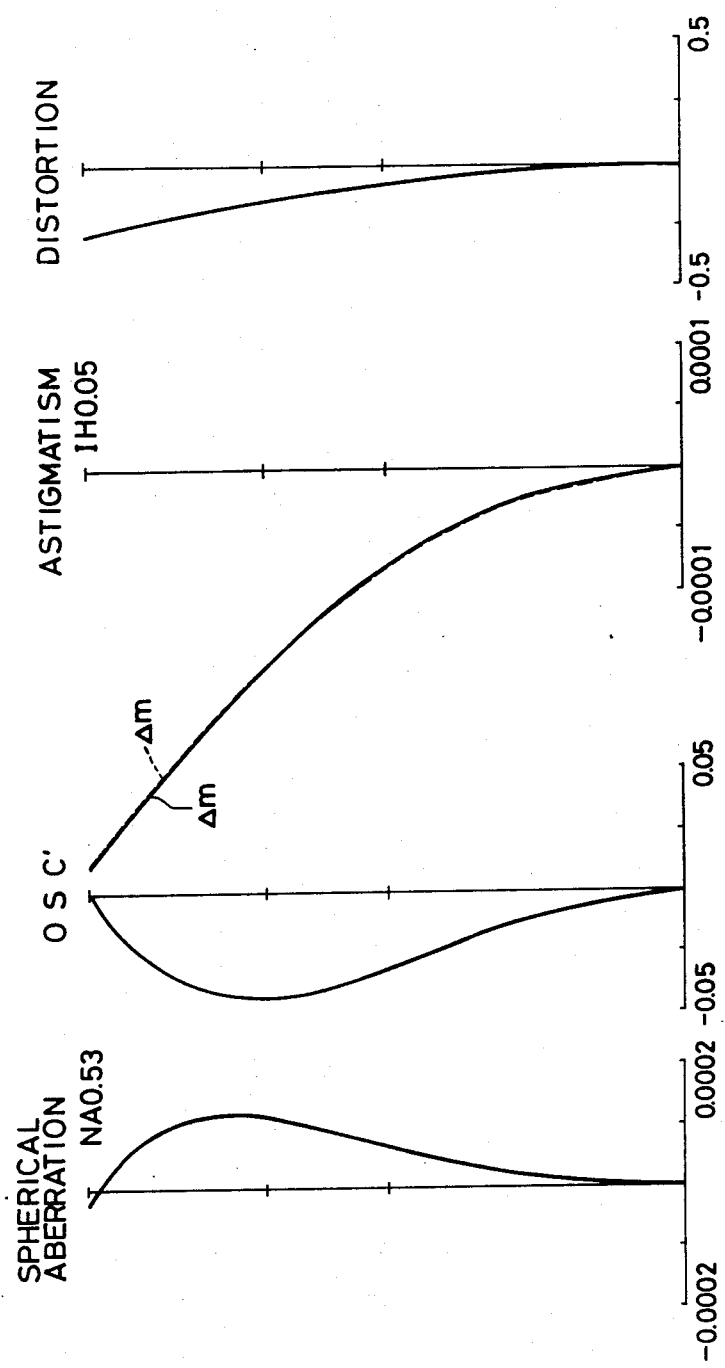
FIGS. 2 through 6 respectively show graphs illustrating aberration curves of Embodiments 1 through 5 of the present invention.
Figure 3:
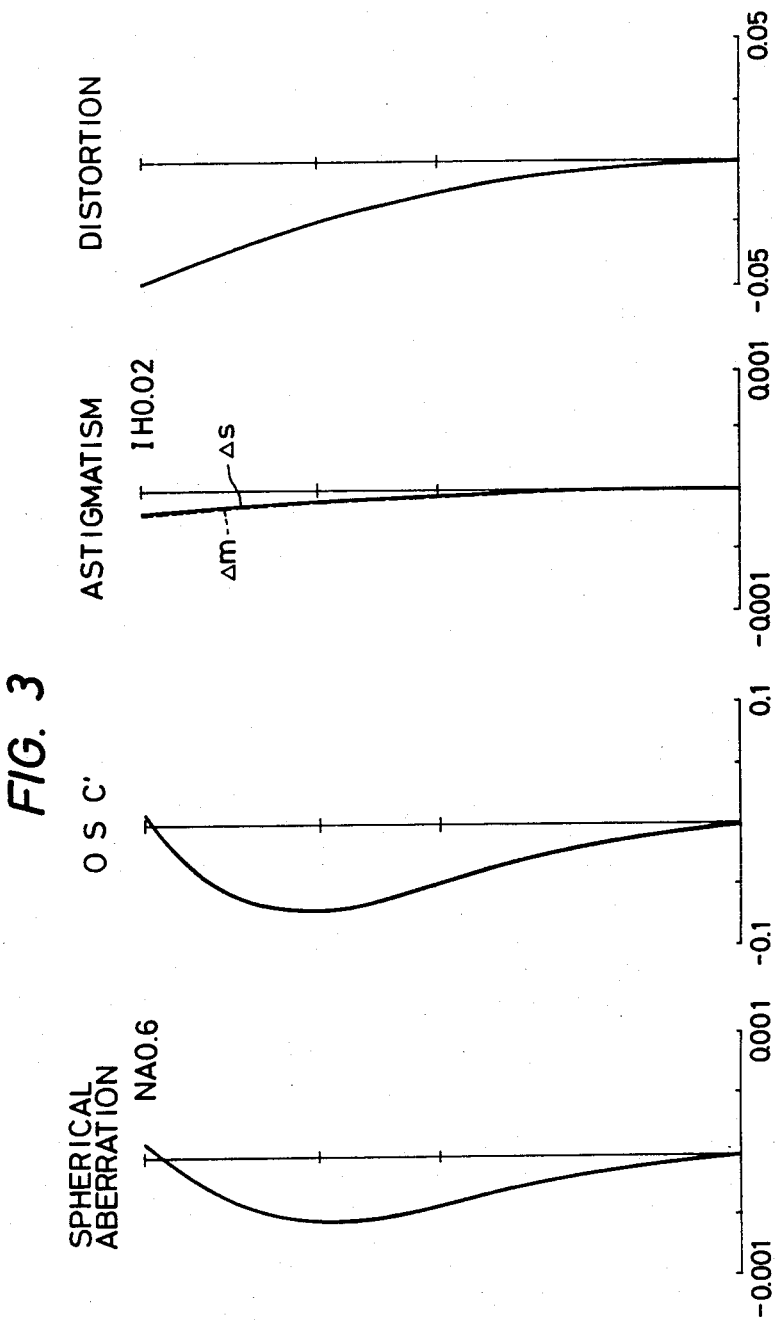

Out of respective embodiments shown in the above, Embodiment 1 is so arranged that the refractive index of the second lens is low and radius of curvature $r_3$ of the surface on the object side of the second lens is small so as to make spherical aberration of the lens system still smaller. In case of this embodiment, NA is large, i.e., 0.53, the working distance WD' when the thickness of the cover glass is taken as the equivalent optical path length is long, i.e., 0.591, and spherical aberration is extremely small as shown in FIG. 2.

Embodiment 2 is arranged that the radius of curvature $r_8$ of the surface on the image side of the fourth lens is large in order to make the value of $f_4/f_3$ small. By this arrangement, it is possible to make WD' long, i.e., 0.516, in spite of the fact that NA is made large, i.e., 0.6. Moreover, offaxial aberrations are also corrected comparatively favourably.

Figure 4:
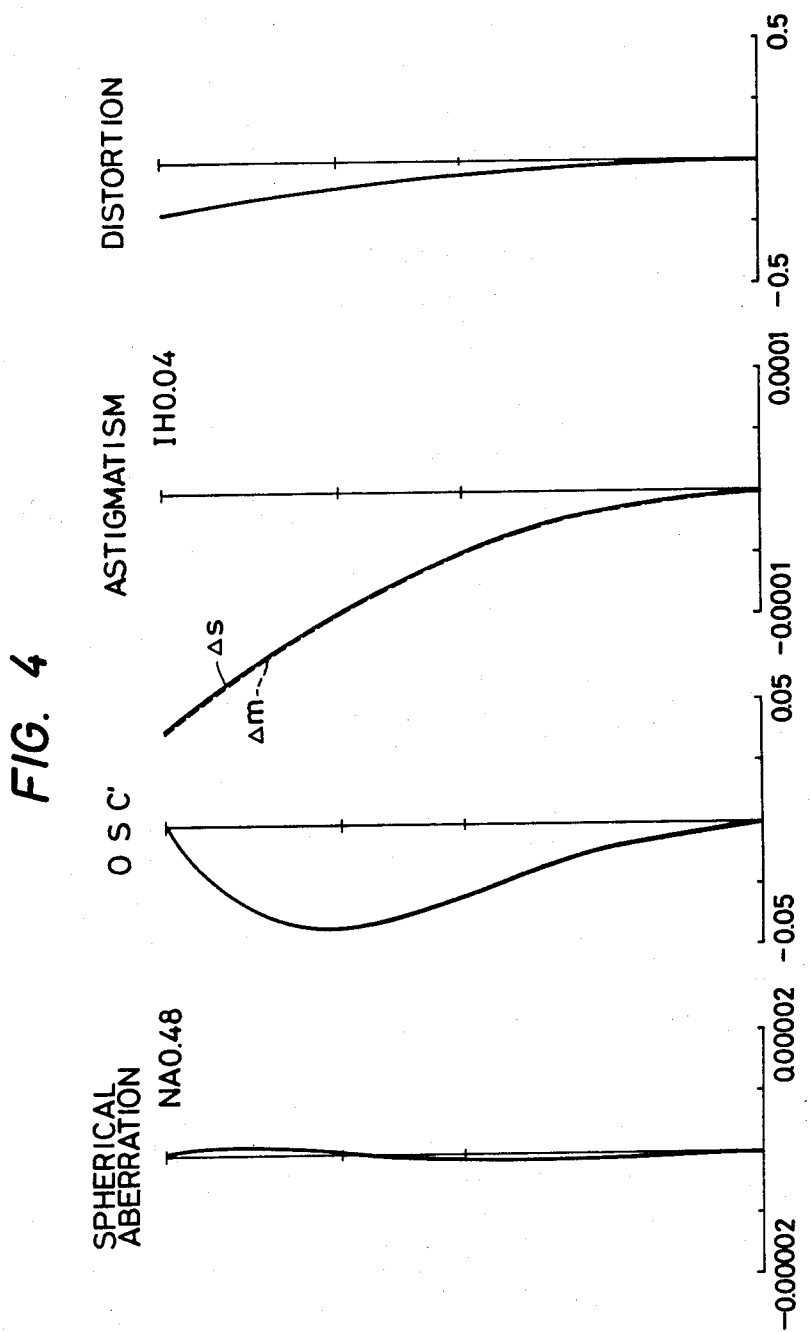
Figure 5:
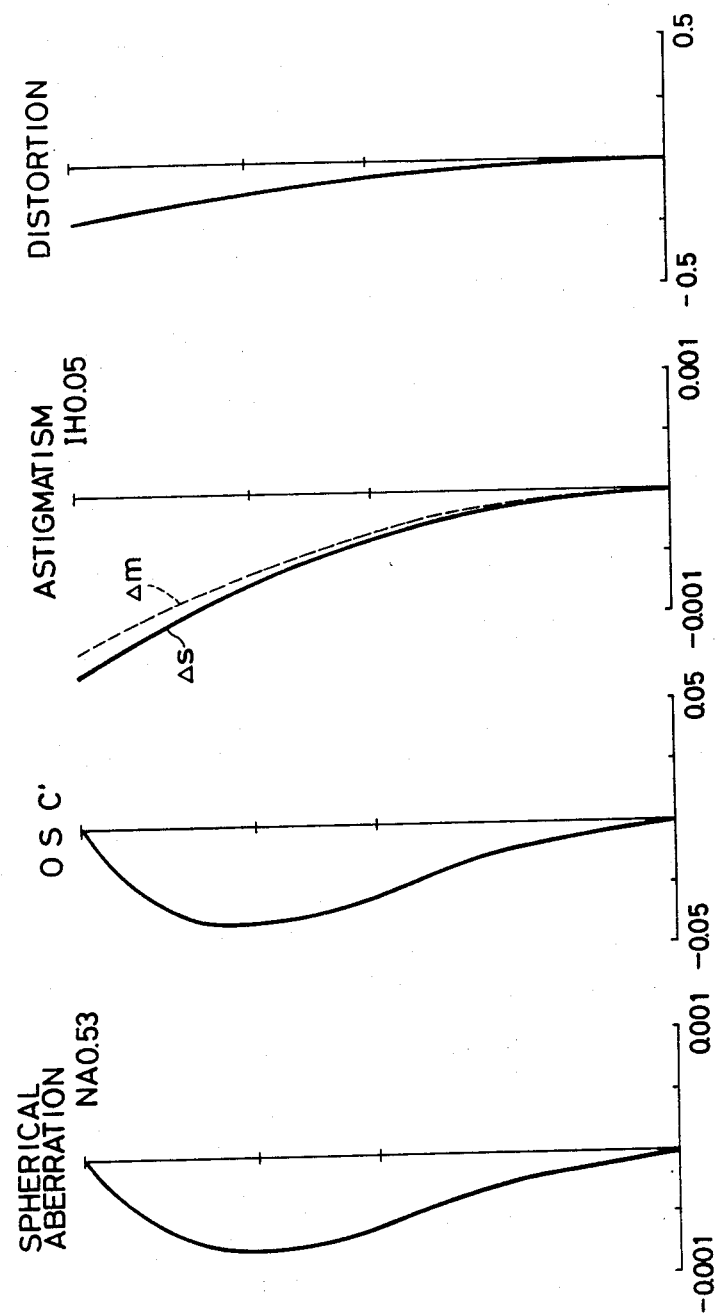
Figure 6:
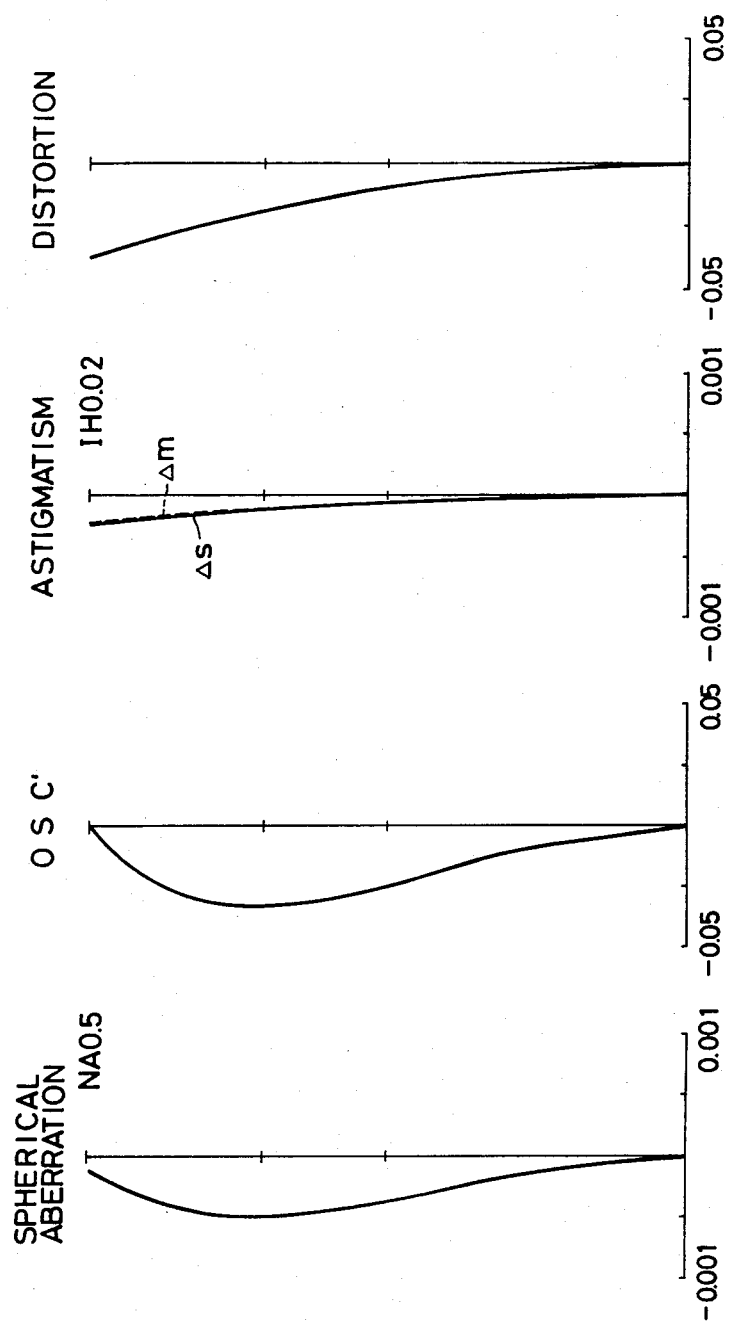

Embodiment 3 is arranged, in the same way as Embodiment 1, that the refractive index $n_2$ of the second lens is low and radius of curvature $r_3$ of the surface on the object side of the second lens is small so as to make spherical aberration small in the same way as Embodiment 1. In case of Embodiment 3, NA is made small, i.e., 0.48, WD' is made long, i.e., 0.609, and spherical aberration is made very small as shown in FIG. 4.

Embodiment 4 is arranged, in the same way as Embodiment 2, that the radius of curvature $r_8$ of the surface on the image side of the fourth lens is large so as to correct offaxial aberrations favourably. In case of the lens system according to Embodiment 4, WD' is made comparatively short, i.e., 0.492, by keeping NA large, i.e., 0.53, and the field angle is made about twice the case of Embodiment 1.

Embodiment 5 is designed by using only such glass materials with which the lenses can be made easily. In case of the lens system according to Embodiment 5, NA=0.5 and WD'=0.57.

Generally, in case that the light to be used is monochromatic light and lenses are made of glass materials with high refractive indices, sufficient antireflection effect is obtained even when lenses are only provided with single-layer coatings of $MgF_2$. Out of respective embodiments of the present invention, Embodiments 1 and 3 are arranged that glass materials with high refractive indices are used for three lenses out of the four lenses constituting the lens system and Embodiments 2, 4 and 5 are arranged that glass materials with high refractive indices are used for all of the four lenses constituting the lens system. Therefore, in case of the lens system according to the present invention, the coating process is simplified and it is easy to manufacture the lenses.

I claim:

1. An optical read-out lens system for optically recorded disks, comprising
   first, second, third and fourth lenses wherein said first lens is a positive lens, said second lens is a negative lens, said third lens is a positive lens and said fourth lens is a positive meniscus lens arranged to be concave toward the disk side,
   said optical read-out lens system satisfying the following four conditions:

$$1.0 < |f_2|/f_1 < 1.4 \quad (1)$$

$$0.55 < f_4/f_3 < 0.8 \quad (2)$$

$$0.3 < d_4(n_2 - 1)/f < 0.55 \quad (3)$$

$$d_2 < 0.1f \quad (4)$$

wherein, reference symbol f represents the focal length of the lens system as a whole, reference symbols $f_1$, $f_2$, $f_3$ and $f_4$ respectively represent focal lengths of the first, second, third and fourth lenses, reference symbol $d_2$ represents the airspace between the first and second lenses, reference symbol $d_4$ represents the airspace between the second and third lenses, and reference symbol $n_2$ represents the refractive index of the second lens.

2. An optical read-out lens system according to claim 1, wherein said first lens is arranged as a plano-convex lens having a planar surface on an image side thereof, and said second lens is arranged as a plano-concave lens having a planar surface on an image side thereof.

3. An optical read-out lens system according to claim 2, wherein said optical read-out lens system satisfies the following numerical data:

| | | |
|---|---|---|
| $r_1 = 2.2897$ | | |
| $d_1 = 0.3060$ | $n_1 = 1.76587$ | $\nu_1 = 25.68$ |
| $r_2 = \infty$ | | |
| $d_2 = 0.0847$ | | |
| $r_3 = -1.7698$ | | |
| $d_3 = 0.1883$ | $n_2 = 1.52449$ | $\nu_2 = 48.9$ |
| $r_4 = \infty$ | | |
| $d_4 = 0.8378$ | | |
| $r_5 = 2.3890$ | | |
| $d_5 = 0.2589$ | $n_3 = 1.76587$ | $\nu_3 = 25.68$ |
| $r_6 = -4.4886$ | | |
| $d_6 = 0.0235$ | | |
| $r_7 = 0.7656$ | | |
| $d_7 = 0.2824$ | $n_4 = 1.76587$ | $\nu_4 = 25.68$ |
| $r_8 = 1.6950$ | | |
| $f = 1$ | $WD = 0.4000$ | $NA = 0.53$ | wherein, reference symbols $r_1$ through $r_8$ respectively represent radii of curvature of respective lens surfaces, reference symbols $d_1$ through $d_7$ respectively represent thicknesses of respective lenses and airspaces between respective lenses, reference symbols $n_1$, $n_2$, $n_3$ and $n_4$ respectively represent refractive indices of respective lenses for 800 nm wavelength light, reference symbols $\nu_1$, $\nu_2$, $\nu_3$ and $\nu_4$ respectively represent Abbe's numbers of respective lenses at d-line, and reference symbol WD represents the working distance.

4. An optical read-out lens system according to claim 2, wherein said optical read-out lens system satisfies the following numerical data:

| | | |
|---|---|---|
| $r_1 = 1.6266$ | | |
| $d_1 = 0.3552$ | $n_1 = 1.76307$ | $\nu_1 = 25.71$ |
| $r_2 = \infty$ | | |
| $d_2 = 0.0888$ | | |
| $r_3 = -2.0974$ | | |
| $d_3 = 0.1776$ | $n_2 = 1.76307$ | $\nu_2 = 25.71$ |
| $r_4 = \infty$ | | |
| $d_4 = 0.4883$ | | |
| $r_5 = 2.9034$ | | |
| $d_5 = 0.2886$ | $n_3 = 1.76307$ | $\nu_3 = 25.71$ |
| $r_6 = -4.9245$ | | |
| $d_6 = 0.0222$ | | |
| $r_7 = 0.7913$ | | |
| $d_7 = 0.2886$ | $n_4 = 1.76307$ | $\nu_4 = 25.71$ |
| $r_8 = 2.6786$ | | |
| $f = 1$ | $WD = 0.2949$ | $NA = 0.6$ | wherein, reference symbols $r_1$ through $r_8$ respectively represent radii of curvature of respective lens surfaces, reference symbols $d_1$ through $d_7$ respectively represent thicknesses of respective lenses and airspaces between respective lenses, reference symbols $n_1$, $n_2$, $n_3$ and $n_4$ respectively represent refractive indices of respective lenses for 800 nm wavelength light, reference symbols $\nu_1$, $\nu_2$, $\nu_3$ and $\nu_4$ respectively represent Abbe's numbers of respective lenses at d-line, and reference symbol WD represents the working distance.

5. An optical read-out lens system according to claim 2, wherein said optical read-out lens system satisfies the following numerical data:

| | | |
|---|---|---|
| $r_1 = 2.2184$ | | |
| $d_1 = 0.2339$ | $n_1 = 1.77861$ | $\nu_1 = 25.71$ |
| $r_2 = \infty$ | | |
| $d_2 = 0.0809$ | | |
| $r_3 = -1.8347$ | | |
| $d_3 = 0.1475$ | $n_2 = 1.51462$ | $\nu_2 = 64.15$ |
| $r_4 = \infty$ | | |
| $d_4 = 0.8689$ | | |
| $r_5 = 2.3558$ | | |
| $d_5 = 0.2267$ | $n_3 = 1.77861$ | $\nu_3 = 25.71$ |
| $r_6 = -7.4285$ | | |
| $d_6 = 0.0180$ | | |
| $r_7 = 0.7726$ | | |
| $d_7 = 0.2482$ | $n_4 = 1.77861$ | $\nu_4 = 25.71$ |
| $r_8 = 1.9842$ | | |
| $f = 1$ | $WD = 0.4533$ | $NA = 0.48$ | wherein, reference symbols $r_1$ through $r_8$ respectively represent radii of curvature of respective lens surfaces, reference symbols $d_1$ through $d_7$ respectively represent thicknesses of respective lenses and airspaces between respective lenses, reference symbols $n_1$, $n_2$, $n_3$ and $n_4$ respectively represent refractive indices of respective lenses for 800 nm wavelength light, reference symbols $\nu_1$, $\nu_2$, $\nu_3$ and $\nu_4$ respectively represent Abbe's numbers of respective lenses at d-line, and reference symbol WD represents the working distance.

6. An optical read-out lens system according to claim 2, wherein said optical read-out lens system satisfies the following numerical data:

| | | |
|---|---|---|
| $r_1 = 1.5905$ | | |
| $d_1 = 0.3765$ | $n_1 = 1.74404$ | $\nu_1 = 26.52$ |
| $r_2 = \infty$ | | |
| $d_2 = 0.0941$ | | |
| $r_3 = -2.0805$ | | |
| $d_3 = 0.1882$ | $n_2 = 1.74404$ | $\nu_2 = 26.52$ |
| $r_4 = \infty$ | | |
| $d_4 = 0.5176$ | | |
| $r_5 = 2.4326$ | | |
| $d_5 = 0.3059$ | $n_3 = 1.74404$ | $\nu_3 = 26.52$ |
| $r_6 = -5.5123$ | | |
| $d_6 = 0.0235$ | | |
| $r_7 = 0.7523$ | | |
| $d_7 = 0.3059$ | $n_4 = 1.74404$ | $\nu_4 = 26.52$ |
| $r_8 = 2.3248$ | | |
| $f = 1$ | $WD = 0.3038$ | $NA = 0.53$ | wherein, reference symbols $r_1$ through $r_8$ respectively represent radii of curvature of respective lens surfaces, reference symbols $d_1$ through $d_7$ respectively represent thicknesses of respective lenses and airspaces between respective lenses, reference symbols $n_1$, $n_2$, $n_3$ and $n_4$ respectively represent refractive indices of respective lenses for 800 nm wavelength light, reference symbols $\nu_1$, $\nu_2$, $\nu_3$ and $\nu_4$ respectively represent Abbe's numbers of respective lenses at d-line, and reference symbol WD represents the working distance.

7. An optical read-out lens system according to claim 2, wherein said optical read-out lens system satisfies the following numerical data:

| | | |
|---|---|---|
| $r_1 = 1.6568$ | | |
| $d_1 = 0.2778$ | $n_1 = 1.74132$ | $\nu_1 = 26.52$ |
| $r_2 = \infty$ | | |
| $d_2 = 0.0611$ | | |
| $r_3 = -2.1467$ | | |
| $d_3 = 0.1852$ | $n_2 = 1.74132$ | $\nu_2 = 26.52$ |
| $r_4 = \infty$ | | |

-continued

| | | |
|---|---|---|
| $d_4 = 0.6483$ | | |
| $r_5 = 2.4256$ | | |
| $d_5 = 0.2408$ | $n_3 = 1.74132$ | $\nu_3 = 26.52$ |
| $r_6 = -5.1354$ | | |
| $d_6 = 0.0185$ | | |
| $r_7 = 0.7616$ | | |
| $d_7 = 0.2408$ | $n_4 = 1.74132$ | $\nu_4 = 26.52$ |
| $r_8 = 2.0593$ | | |
| $f = 1$ | $WD = 0.3861$ | $NA = 0.5$ | wherein, reference symbols $r_1$ through $r_8$ respectively represent radii of curvature of respective lens surfaces, reference symbols $d_1$ through $d_7$ respectively represent thicknesses of respective lenses and airspaces between respective lenses, reference symbols $n_1$, $n_2$, $n_3$ and $n_4$ respectively represent refractive indices of respective lenses for 800 nm wavelength light, reference symbols $\nu_1$, $\nu_2$, $\nu_3$ and $\nu_4$ respectively represent Abbe's numbers of respective lenses at d-line, and reference symbol WD represents the working distance.

* * * * *